United States Patent
Kuo et al.

(10) Patent No.: US 7,903,295 B2
(45) Date of Patent: *Mar. 8, 2011

(54) AUTOMATIC STATIC IMAGE CAPTURING DEVICE AND METHOD

(75) Inventors: Shih-Zheng Kuo, Taipei Hsien (TW); Yu-Ru Yu, Hsinchu Hsien (TW)

(73) Assignee: Transpacific Systems, LLC, Taipei (TW)

( * ) Notice: Subject to any disclaimer, the term of this patent is extended or adjusted under 35 U.S.C. 154(b) by 632 days.

This patent is subject to a terminal disclaimer.

(21) Appl. No.: 11/551,123

(22) Filed: Oct. 19, 2006

(65) Prior Publication Data

US 2007/0211309 A1   Sep. 13, 2007

Related U.S. Application Data

(63) Continuation of application No. 09/967,569, filed on Sep. 27, 2001, now Pat. No. 7,139,107.

(51) Int. Cl.
*H04N 1/04* (2006.01)
(52) U.S. Cl. ......... 358/474; 358/486; 358/488; 358/497; 358/909.1
(58) Field of Classification Search .................. 358/486, 358/488, 909.1, 906, 406, 497, 494, 474, 358/505, 504; 348/208.13, 208.4, 208.5, 348/208.15, 208.99, 208.14; 382/312, 275, 382/318, 319; 396/55, 54, 52; 399/211, 399/212
See application file for complete search history.

(56) References Cited

U.S. PATENT DOCUMENTS

| | | | |
|---|---|---|---|
| 5,012,270 | A | 4/1991 | Sekine et al. |
| 5,500,745 | A | 3/1996 | Iishiba et al. |
| 5,790,490 | A * | 8/1998 | Satoh et al. ..................... 396/52 |
| 5,850,575 | A | 12/1998 | Ohishi |
| 5,890,018 | A | 3/1999 | Terui |
| 6,487,369 | B1 | 11/2002 | Sato |
| 6,583,928 | B2 | 6/2003 | Ooki et al. |
| 6,650,442 | B1 | 11/2003 | Chiu |
| 6,687,458 | B2 | 2/2004 | Masuda |
| 6,697,536 | B1 | 2/2004 | Yamada |
| 6,778,768 | B2 | 8/2004 | Ohkawara et al. |
| 6,802,611 | B2 | 10/2004 | Chu et al. |
| 6,810,207 | B2 | 10/2004 | Sato et al. |
| 6,982,746 | B1 | 1/2006 | Kawahara |
| 7,139,107 | B2 * | 11/2006 | Kuo et al. ..................... 358/474 |

FOREIGN PATENT DOCUMENTS

| | | |
|---|---|---|
| TW | 342570 | 10/1998 |
| TW | 442768 | 6/2001 |

* cited by examiner

*Primary Examiner* — Cheukfan Lee
(74) *Attorney, Agent, or Firm* — Stolowitz Ford Cowger LLP

(57) ABSTRACT

A method and a device for automatic capturing of a static image. The automatic static image-capturing device is a scanner. The method includes the following steps. Any changes on a scanning platform are monitored. If a change in the static image on the scanning platform is detected, the change is gauged for a preset time interval to check for any further change during this time interval. If no further change is detected within this time interval, a preset operation is triggered.

34 Claims, 6 Drawing Sheets

AUTOMATIC STATIC IMAGE CAPTURING DEVICE AND METHOD

CROSS-REFERENCE TO RELATED APPLICATIONS

The present application is a continuation of U.S. patent application Ser. No. 09/967,569, filed Sep. 27, 2001 now U.S. Pat. No. 7,139,107, entitled, "AUTOMATIC STATIC IMAGE CAPTURING DEVICE AND METHOD", and is incorporated herewith in its entirety.

BACKGROUND OF THE INVENTION

1. Field of Invention

The present invention relates to a continuous static image capturing device and a method of operating the device. More particularly, the present invention relates to a continuous monitoring device capable of capturing a series of static images automatically.

2. Description of Related Art

In an office or at home, the image of a document is usually captured by a scanner and then stored inside a computer as an electronic file. FIG. 1 is a perspective view of a conventional platform type scanner. FIG. 2 is a listing of the steps required to operate a conventional platform scanner. As shown in FIG. 2, a user must switch on the power source in step s200 and then place a scan document on a scanning platform in step s202.

However, in step s200, the user normally has to wait for a warm-up period before initiating an actual scanning. During this waiting period, the scanning head 10 is normally hidden behind the scanning platform 40 as shown in FIG. 1. In fact, the scanning head 10 may not be seen from above when a platform cover is raised. The scanning head 10 can be seen only when a driving program that drives the driving component inside the scanner in step 204 is initiated and subsequent pre-scanning step s206 and scanning step 208 is executed in sequence.

The scanning steps depicted in FIG. 2 present no problem. However, in an office environment, a peripheral device such as a scanner is often positioned in a central location and shared by a number of users. Users need to shuttle from their working desks to the scanner. Hence, it is always desirable to save time in the actual scanning operation.

A type of device that can replace a conventional camera in capturing images from a scene is the digital camera. However, a common drawback of both conventional and digital cameras is that a photographer must be present to initiate the image capture. In actual fact, the image of a static scene such as a flower can be captured automatically without having to have a photographer on standby. Hence, a device capable of capturing a static scene in the absence of a photographer is a great convenience to users.

SUMMARY OF THE INVENTION

Accordingly, one object of the present invention is to provide a scanning device for capturing a static scene automatically capable of speeding up image processing and simplifying static image scanning by scanners or digital cameras.

The scanner includes a scanning platform serving as a location for capturing static images. The automatic static image-capturing device includes a scanning head, an image-capturing device, a buffer and a logic decision device.

The scanning head is mounted underneath the scanning platform for continuous detection of static scenes by a to-and-fro movement. The image-capturing device is an element for capturing a static image and transforming the image into image data. The buffer is connected to the image-capturing device for holding previously captured image data from the image-capturing device. The logic decision device is coupled to the image-capturing device and the buffer for deciding whether the data registered inside the buffer and image data captured by the image-capturing device in a subsequent image-capturing operation are identical or not.

This invention also provides a method of capturing a static image automatically. The method aims to capture the static image of a scan document and includes the following steps. Any changes on a scanning platform are monitored. If a change in the static image on the scanning platform is detected, the change is gauged for a preset time interval to check for any further change during this time interval. If no further change within this preset time interval is detected, a preset operation such as a pre-scanning operation or a scanning operation is triggered.

This invention also provides an alternative method of capturing a static image automatically. The method aims to capture the static image of a scene and includes the following steps. Any changes in a static scene are continuously checked. If a change in the static scene is detected, the change is gauged for a preset time interval to check for any further change during this time interval. If no further change within this preset time interval is detected, the static scene is captured in a scanning operation.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
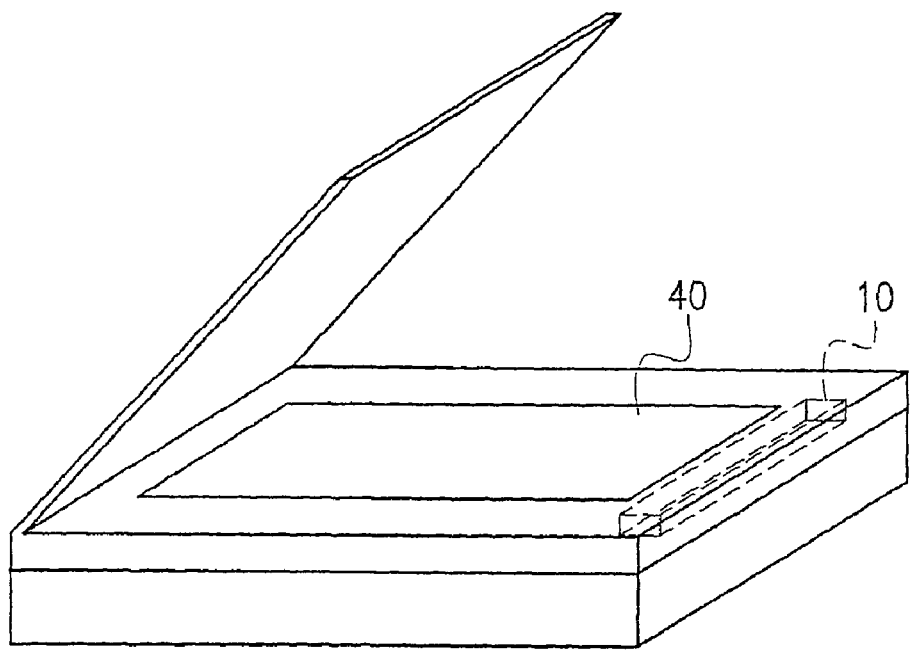
FIG. 1 is a perspective view of a conventional platform type scanner.
Figure 2:
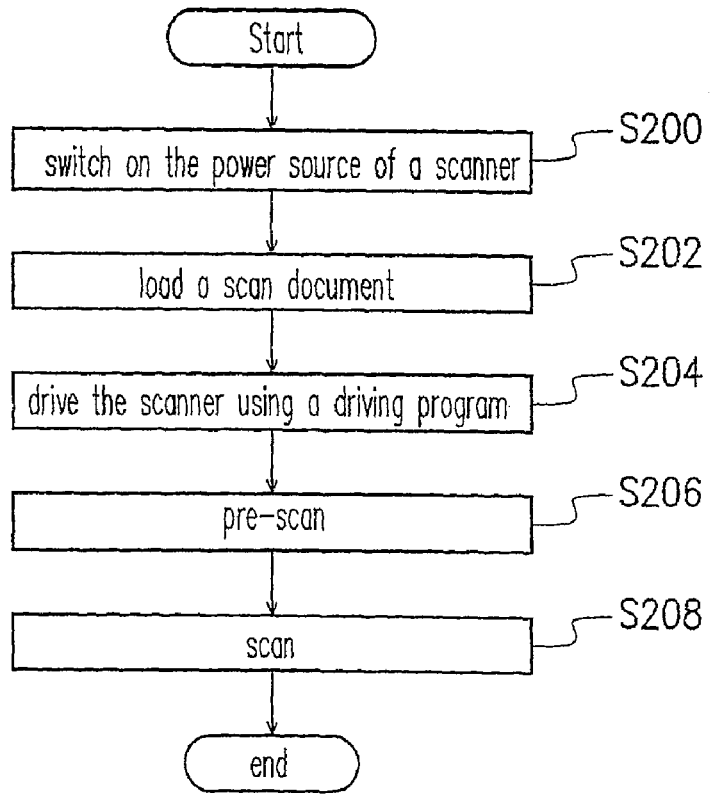
FIG. 2 is a listing of the steps required to operate a conventional platform scanner.

Reference will now be made in detail to the present preferred embodiments of the invention, examples of which are illustrated in the accompanying drawings. Wherever possible, the same reference numbers are used in the drawings and the description to refer to the same or like parts.

Figure 3:
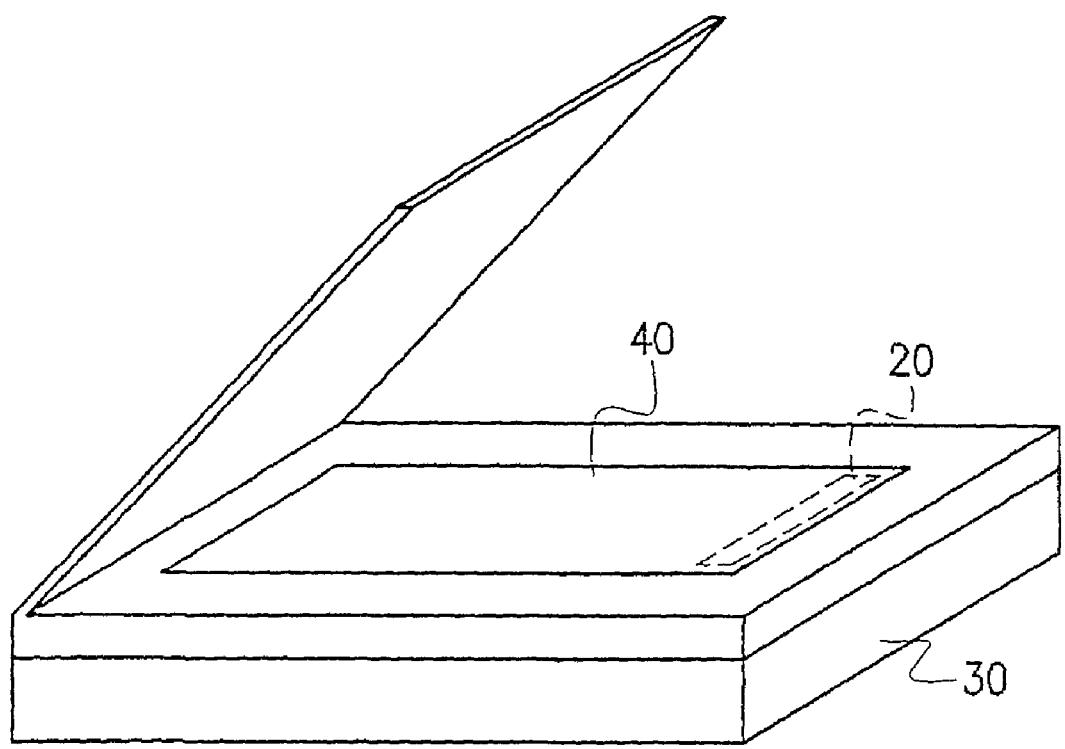
FIG. 3 is a perspective view of a platform type scanner according to this invention.
Figure 4:
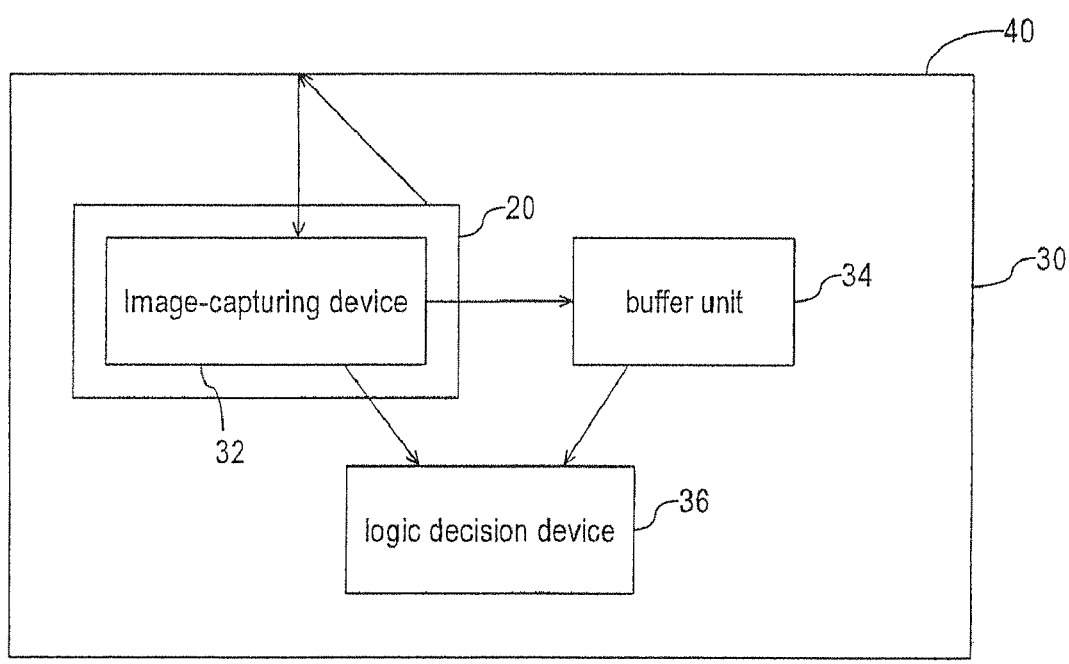
FIG. 4 is a block diagram showing a scanner designed according to one preferred embodiment of this invention.

FIG. 3 is a perspective view of a platform type scanner according to this invention. FIG. 4 is a block diagram showing a scanner designed according to one preferred embodiment of this invention. As shown in FIGS. 3 and 4, the scanning device is a platform type scanner having a scanning platform 40 for holding a static image such as a scan document. The automatic static image-capturing device includes a scanning head 20 and a decision logic device 36. The scanning head 20 is mounted somewhere underneath the scanning platform 40. The scanning head 20 can be driven across the scanning platform 40 by a driving element (not shown) after the power switch is triggered and can be seen as the upper platform cover is raised. The decision device 36 compares image data captured by the scanning head 20 in a previous time period and image data captured by the scanning head in a subsequent time period and shows up any difference between the two. Because a user may repeatedly change the focusing points of a static image while the document is unloaded onto the scanning platform 40, the scanning head 20 needs to sample the focusing points of the static image after each fixed timing cycle. Thus, the scanning head 20 shuttles to-and-fro underneath the scanning platform 40 for awhile before the end of a scanning operation. In this manner, new positions of a static image are continuously monitored.

The automatic static image capturing device further includes an image capture device 32 and a buffer unit 34. The image capture device 32 is coupled to the decision logic device 36 for obtaining static image data captured by the scanning head 20. The image capture device 32 can be, for example, a charge coupled device (CCD) or a contact image sensor (CIS). However, any image-capturing device should also fall under the scope of this invention. The buffer unit 34 is coupled to the image capture device 32 and the logic decision device for holding image data captured by the image capture device 32 during a previous time interval.

Figure 5:
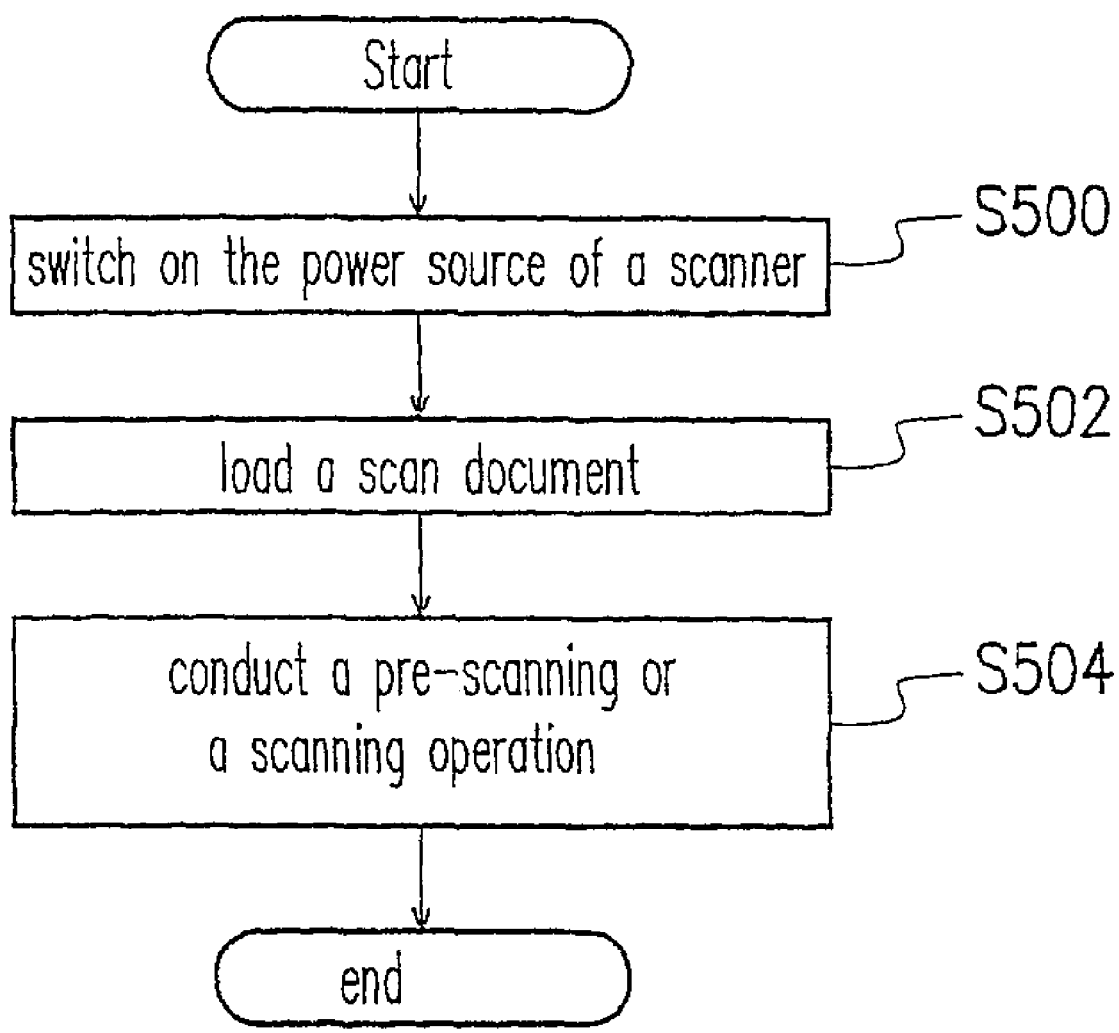
FIG. 5 is a diagram showing a sequence of steps followed by the scanner according to this invention.
Figure 6:
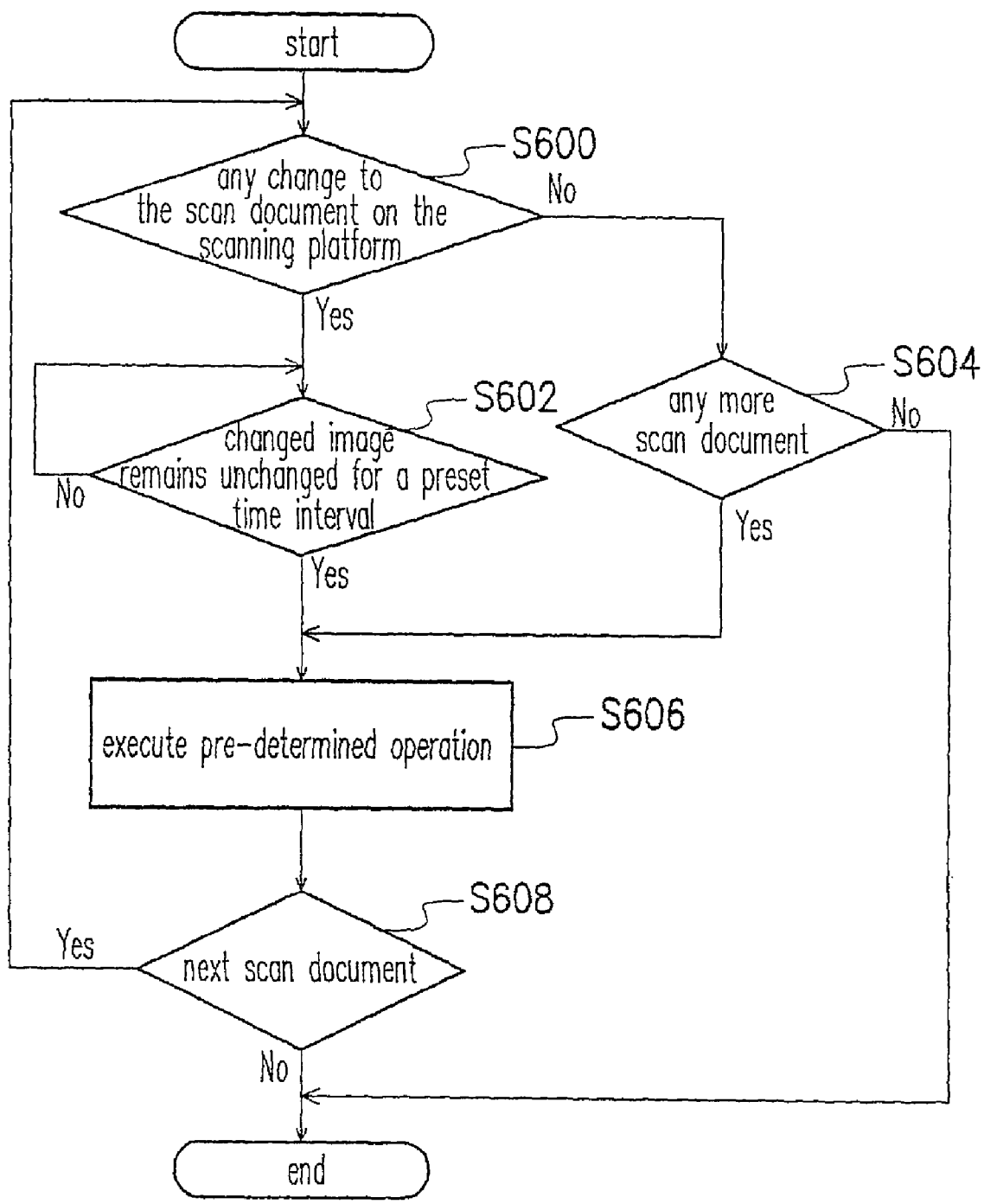
FIG. 6 is a diagram showing a sequence of steps superimposed upon the steps conducted by the scanner in FIG. 5.

FIG. 5 is a diagram showing a sequence of steps followed by the scanner according to this invention. FIG. 6 is a diagram showing a sequence of steps superimposed upon the steps conducted by the scanner in FIG. 5. The steps according to this invention can be applied to a scanner having a scanning platform for capturing static images automatically.

As shown in FIG. 5, a power switch of the scanner is switched on in step s500. In step s502, a document containing a static image is placed on the scanning platform. In step s504, a pre-scanning or a scanning operation is conducted.

In step s502, after placing a static image on the scanning platform, the automatic static image capture further includes the steps shown in FIG. 6. In step s600, any change of the static image on the scanning platform is checked for. In other words, any further correction of static image position by a user is checked after the document is put on the scanning platform. If there is some change, step s602 is executed to check if there is any further change within a preset period. If no more changes are detected at the end of the period, preset actions such as pre-scanning or scanning are triggered in step s606. However, if the static image continues to change before the end of the preset interval, the preset interval is waited anew until a preset interval is passed without further changes.

In step s604, the static image on the scanning platform remains static. The scanner then checks the scanning platform for any static image. If no more static image is detected on the scanning platform, no more preset action is executed. On the other hand, if a static image continues to be detected on the scanning platform, this indicates that the document is properly positioned initially and there is no need to readjust the position. Hence, preset action is executed directly in step s606.

After the preset action in step s606, the scanning platform is checked for any more static image requiring preset action in step s608. If there is one more static image to scan, control is returned to step s600 and any change in the static image on the scanning platform is continuously monitored until no more static image for preset action is present. In other words, the static image scanner automatically shuts down.

Figure 7:
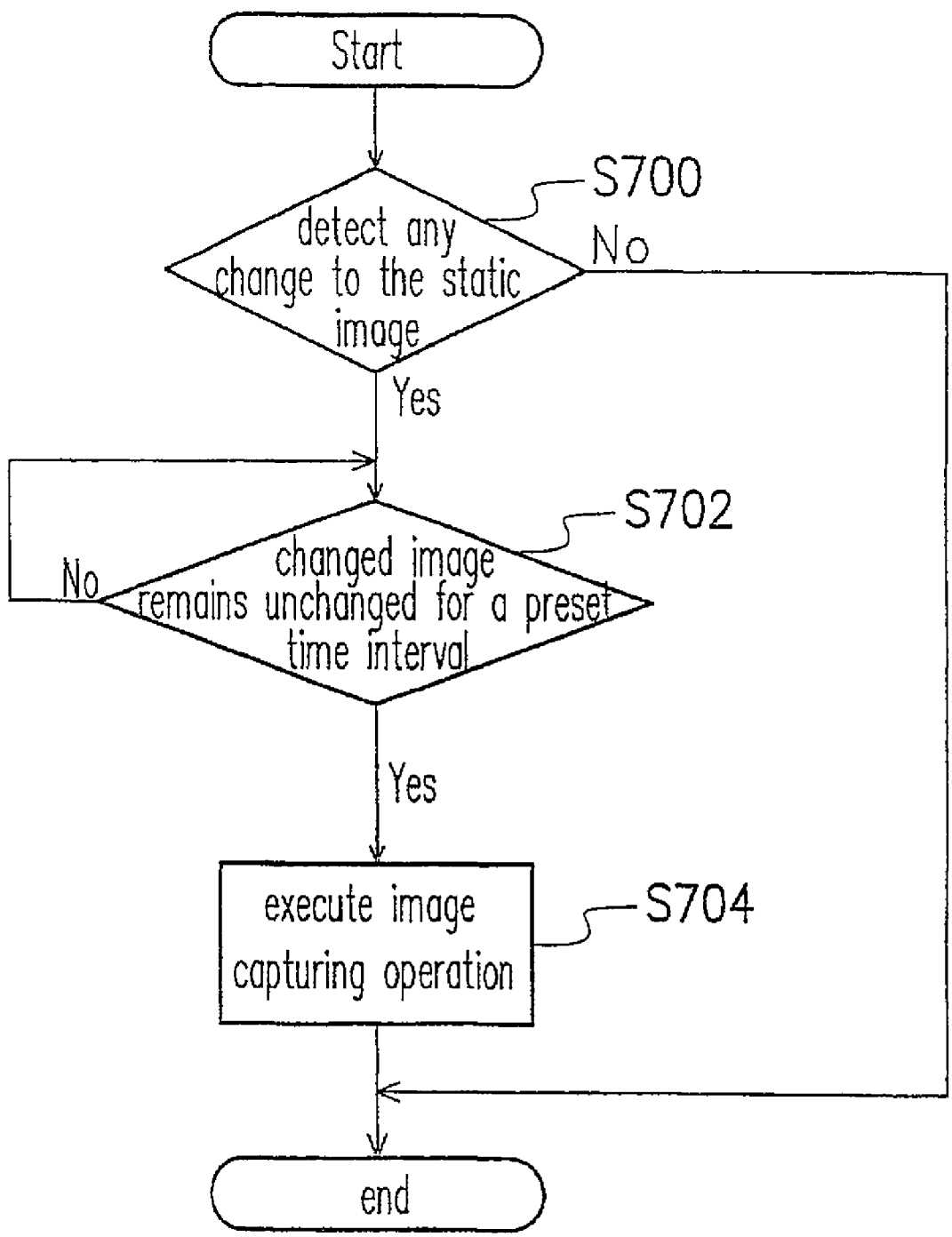
FIG. 7 is a diagram showing a sequence of steps for capturing a static scene by a digital camera according to this invention.

FIG. 7 is a diagram showing a sequence of steps for capturing a static scene by a digital camera according to this invention. The method aims to capture the static image of a scene and includes the following steps. In step s700, any changes in a static scene are continuously checked. If there is some change in the static scene, the change is gauged for a preset interval to check for any further change during this time interval in step s702. If there is no further change within this preset time interval, the static scene is captured in a scanning operation in step s704. If continuous polling of the static scene in step s700 detects no changes, image-capturing actions in step s704 are always suspended.

In summary, major advantages of this invention include:

1. If the static image-capturing device is a scanner, the scanner will check for the presence of any static image continuously once the scanner is turned on. There is no need for a user to initiate a pre-scanning or a scanning operation because this is done automatically as long as the scan document is properly positioned. Since the scanning operation is triggered automatically, scanning time is shortened.

2. If the static image-capturing device is a digital camera, the camera is able to photograph changes in the static image such as a blossoming flower. Since the static scene is captured automatically, there is no need for the presence of a human photographer after the camera is properly set up.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method comprising:
   detecting at least one change in a static image captured using a static image-capturing device;
   monitoring for any further changes in said changed image during a preset time interval; and
   executing an image-capturing operation in response to said changed image remaining unchanged, wherein said image capturing operation is executed after said preset time interval.

2. The method of claim 1, wherein said static image-capturing device comprises a digital camera.

3. The method of claim 1, wherein said static image-capturing device comprises a scanner.

4. The method of claim 1, wherein said image-capturing operation comprises a scanning operation.

5. The method of claim 1, further comprising:
   executing a pre-scanning operation during said preset time interval, wherein said further changes are monitored from said pre-scanning operation.

6. The method of claim 1, wherein said at least one change comprises a change in focusing position of said static image.

7. The method of claim 1, wherein said static image-capturing device comprises a digital imaging apparatus.

8. The method of claim 1, further comprising automatically repeating said detecting, said monitoring, and said executing to obtain a series of captured images.

9. The method of claim 1, wherein detecting at least one change comprises detecting a change between said static image and a previously captured static image.

10. The method of claim 1, further comprising capturing subsequent static images during said preset time interval, wherein monitoring for any further changes comprises monitoring for a change between said subsequent static images and said static image, and wherein said image-capturing operation is executed in response to said subsequent static images remaining unchanged from said static image.

11. A scanner comprising:
a scanning head configured to obtain a static image; and
a decision logic device configured to:
   detect a change in said static image as compared to a previous static image;
   monitor subsequent static images for changes from said static image; and
   initiate execution of an image-capturing operation in response to said subsequent static images remaining unchanged from said static image for a period of time.

12. The scanner of claim 11, further comprising a buffer unit to store said previous static image, wherein said previous static image is previously obtained by said scanning head.

13. The scanner of claim 12, wherein said decision logic device is further configured to detect said changes in said subsequent images as compared to said static image.

14. The scanner of claim 11, wherein said scanning head further comprises an image-capturing device.

15. The scanner of claim 14, wherein said image-capturing device comprises a charge coupled device.

16. The scanner of claim 14, wherein said image-capturing device is configured to:
capture said static image; and
transform said static image into image data.

17. The scanner of claim 11, wherein said decision logic device is further configured to initiate execution of a pre-scanning operation during said period of time to identify said changes.

18. The scanner of claim 11, wherein said scanning head is mounted underneath a scanning platform.

19. A device comprising:
means for capturing a static image;
means for detecting at least one change in said static image;
means for monitoring said changed image for further changes during a preset time interval; and
means for executing an image-capturing operation in response to said changed image remaining unchanged, wherein said image-capturing operation is executed after said preset time interval.

20. The device of claim 19, wherein said means for capturing said static image comprises a scanner.

21. The device of claim 19, wherein said means for capturing said static image comprises a digital camera.

22. The device of claim 19, wherein said means for detecting is configured to detect a further change of said changed image, and wherein said means for capturing is configured to capture said further changed image.

23. The device of claim 19, wherein said at least one change comprises a difference in a position of said static image.

24. The device of claim 23, wherein said position comprises a focusing position.

25. An apparatus comprising:
an image-capturing device configured to obtain a plurality of images; and
a decision logic device configured to:
   detect one or more changes between said plurality of images; and
   initiate execution of an image-capturing operation after no further changes are detected for a preset period of time.

26. The apparatus of claim 25, wherein said plurality of images comprises a previously captured image and a later captured image, and wherein said image-capturing operation is executed when no changes are detected between said previously captured image and said later captured image.

27. A method comprising:
capturing a first image of an object;
capturing a sequence of images during a preset time interval, wherein said sequence of images comprises a last-changed image;
detecting a difference between said first image and said last-changed image;
monitoring said sequence of images for an additional difference from said last-changed image; and
executing an image-capturing operation of said object in response to there being no additional difference detected during said preset time interval.

28. The method of claim 27, wherein said sequence of images further comprises a next image, and wherein said image-capturing operation is executed after said preset time interval when no difference is detected between said last-changed image and said next image.

29. The method of claim 27, wherein said sequence of images is captured by a pre-scanning operation.

30. A device comprising:
means for capturing a static image;
means for detecting at least one change in said static image as compared to a previously captured static image;
means for monitoring a plurality of subsequent images for changes from said static image during a preset time interval; and
means for executing an image-capturing operation in response to said plurality of subsequent images remaining unchanged from said static image, wherein said image-capturing operation is executed after said preset time interval.

31. The device of claim 30, wherein said means for detecting is further configured to detect said changes in said plurality of subsequent images as compared to said static image.

32. The device of claim 30, wherein said at least one change comprises a difference in a position between said static image and said previously captured static image.

33. An apparatus comprising:
an image-capturing device configured to obtain a static image; and
a decision logic device configured to:
   detect one or more changes between said static image and a previously obtained image;
   monitor a plurality of subsequent images for changes from said static image; and
   initiate execution of an image-capturing operation in response to said plurality of subsequent images remaining unchanged from said static image for a preset period of time.

34. The apparatus of claim 33, wherein said plurality of subsequent images are obtained by said image-capturing device.

* * * * *